Figure 1:
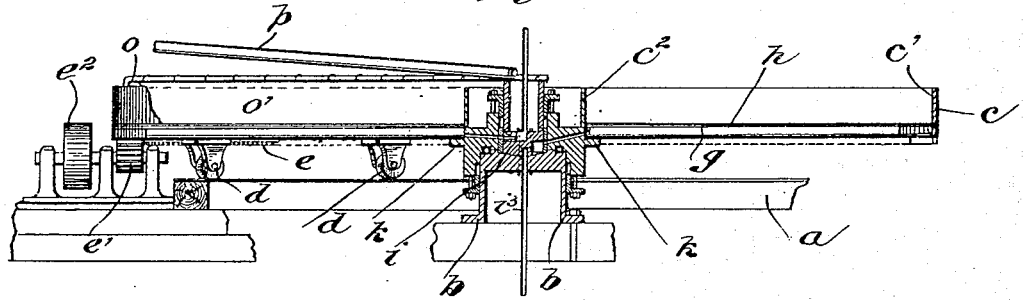

No. 805,229. PATENTED NOV. 21, 1905.
E. PARRISH.
APPARATUS FOR TREATING SLIMES.
APPLICATION FILED APR. 12, 1905.

2 SHEETS—SHEET 1.

Attest:

Inventor:
Edward Parrish
by N. L. Frothingham
his Atty.

No. 805,229. PATENTED NOV. 21, 1905.
E. PARRISH.
APPARATUS FOR TREATING SLIMES.
APPLICATION FILED APR. 12, 1905.

UNITED STATES PATENT OFFICE.

EDWARD PARRISH, OF NEWPORT, RHODE ISLAND.

APPARATUS FOR TREATING SLIMES.

No. 805,229.   Specification of Letters Patent.   Patented Nov. 21, 1905.

Application filed April 12, 1905. Serial No. 255,170.

*To all whom it may concern:*

Be it known that I, EDWARD PARRISH, a citizen of the United States, residing at Newport, in the county of Newport and State of Rhode Island, have invented certain new and useful Improvements in Apparatus for Treating Slimes, of which the following is a specification, reference being had therein to the accompanying drawings, which form a part thereof.

My invention relates to apparatus for treating slimes, and more particularly to an apparatus of that character wherein the solution is separated from the insoluble matter of the slimes by a process of filtration.

The main object of the invention is to provide an apparatus wherein a large percentage of the solution may be separated from the slimes at a single operation, thus avoiding material loss of the metal in solution and of the potassium cyanid through the retention of the solution by the tailings and the time and labor in reclaiming such solution and diminishing the tank capacity of a plant.

A further object is to provide an apparatus which, through its operation being practically continuous, will have a large capacity.

A still further object is to provide an apparatus wherein the slimes may be fed to and distributed upon the filter in a manner to aid in the filtration of the mass, and the tailings may be removed without necessitating the interruption of the operation of the apparatus.

A still further object is to provide an apparatus wherein a partial vacuum may be maintained beneath all parts of the apparatus required in filtering the slimes to aid in the separation of the solution and yet wherein all parts of the entire filter may be successively subjected to normal atmospheric or greater pressure beneath said filter to aid in the loosening and discharge of the tailings therefrom.

A still further object is to provide an apparatus wherein the filter will be rotated about a fixed center to successively bring all parts thereof into position for charging and discharging and to provide compact and convenient means maintaining the vacuum beneath the filter and drawing off the solution separated from the slimes.

A still further object is to provide a filter-tank so divided into compartments beneath the filter-body as to permit these compartments to be successively cut out from the vacuum-chamber, so as to limit the period of interruption of the filtration under a vacuum to only that required to remove or discharge the tailings from each compartment successively, and thus avoid the stoppage of the apparatus for this purpose.

A still further object is to provide a protecting sheathing for the filter-body, both to avoid injury to said body and to facilitate the use of various implements or mechanisms for removing or discharging the tailings therefrom.

A still further object is to provide a simple cut-out-valve mechanism whereby air under normal atmospheric or greater pressure may be admitted into said compartments of the filter successively without interfering with that vacuum maintained in all other compartments, and, further, a valve of this character which will act automatically.

A further object is to provide in such an apparatus means whereby the point of charging and discharging may be in close proximity to each other to avoid a limitation of the capacity of the apparatus without liability of the slimes when first charged into the filter flowing onto and mixing with the tailings; and a still further object is to provide an apparatus the design, construction, and arrangement of which will be simple, substantial, and durable to permit its installation, operation, and maintenance at small expense.

The invention consists, primarily, in the combination, in an apparatus of this character, of a horizontal filter-tank, a plurality of partitions whereby the lower part of said tank is divided into a plurality of compartments, a filter-body over and forming a slimes-chamber common to all said compartments, means feeding slimes to said body, means whereby said tank may be rotated and means maintaining a vacuum in said compartments, and in such other novel features of construction and arrangement of parts as are hereinafter set forth and described, and more particularly pointed out in the claims hereto appended.

Figure 2:
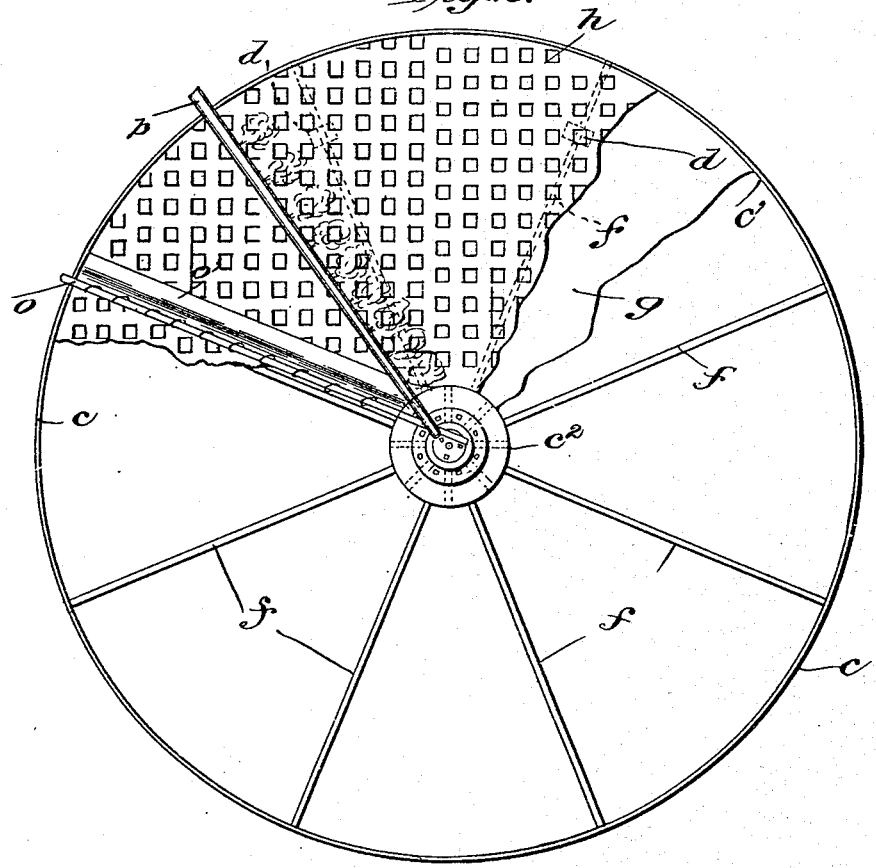
Figure 3:
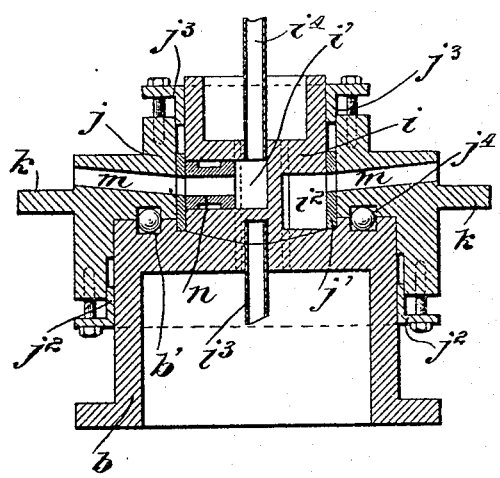
Figure 4:
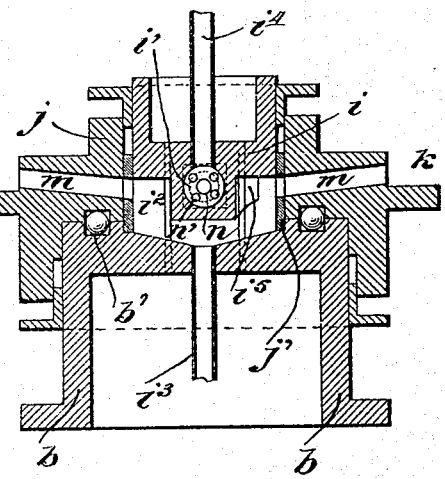
Figure 5:
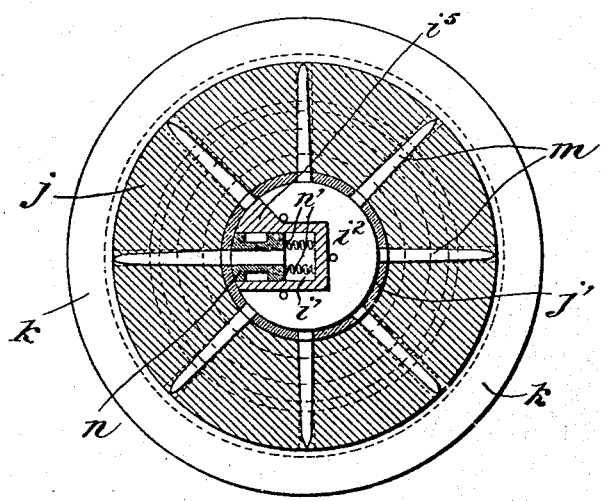

Referring to the drawings, Figure 1 is a sectional elevation of a filter apparatus embodying my invention. Fig. 2 is a plan view thereof with the filter-body and its protecting sheathing broken away. Fig. 3 is a cross-section of the bearing and the hub of the apparatus, showing a side sectional elevation of the air or pressure and the vacuum chambers. Fig. 4 is a similar view showing an end secional elevation of the said chambers, and Fig. 5 is a horizontal section of the said bearing and hub.

Like letters refer to like parts throughout the several views.

In the drawings, $a$ indicates a circular track centrally of which is a vertical bearing $b$, carried upon and forming a part of a suitable pedestal or foundation. Mounted upon said bearing by means of a hub, to be more particularly described hereinafter, is a filter-tank $c$, carrying a plurality of rollers $d$, adapted to run on the track $a$ and support the outer edge of said tank $c$. On the under side of said tank, near its periphery, is a circular rack $e$, by means of which said tank is rotated through the pinion $e'$, meshing therewith, and driven from the pulley $e^2$ and any desired source of power. While the rack-and-pinion mechanism as above is preferred, any desired means rotating said tank may be employed.

The tank $c$ has an outer wall $c'$ to confine the slimes within said tank and an inner wall $c^2$ to protect said hub from said slimes, and the lower part thereof is divided by the radial partitions $f$, extending from the inner wall $c^2$ to the outer wall $c'$, into a plurality of relatively air-tight compartments, each of which is entirely independent of the other in so far as the filtration of the slimes is concerned, this division being for the purpose of increasing the capacity of the apparatus and its efficiency by increasing the period during which the vacuum may be maintained under each charge of slimes through the limitation of the period of discharge under normal atmospheric or greater pressure within each compartment. Stretched over these partitions $f$ in a manner to exclude solids from the compartments is a filter-body $g$, preferably of burlap, canvas, or some similar material. I provide a perforated metallic sheathing $h$ for said filter-body to protect the same from the insoluble matter in the slimes, and, further, from the implements or mechanism used in discharging the tailings. For convenience of expression the compartments heretofore referred to will be termed "vacuum-compartments" and the portion of the tank above the said filter-body will be termed the "slimes-chamber." It will be observed that the said chamber is common to all said compartments.

Secured to the pedestal $b$ is a cylindrical casting $i$, the lower portion of which is divided into two independent chambers, (designated by the letters $i'$ $i^2$, respectively,) one of which is relatively smaller than the other. The larger of these chambers is in communication with a vacuum-pump through the pipe $i^3$, and the other or smaller chamber is in communication with a compressed-air tank or the open air through the pipe $i^4$. The larger of these chambers I shall designate the "vacuum-chamber" and the smaller the "pressure-chamber." The pedestal $b$ on its upper surface is provided with a runway $b'$ for ball or roller bearings.

The casting $i$ is extended above the top wall of the chambers $i'$ and $i^2$ to form an extended bearing for the hub carrying the tank $c$, and one side wall of the dividing-partition of the pressure-chamber $i'$ is extended, as at $i^5$, for the purpose of forming a closure to avoid a vacuum or a pressure in each vacuum-compartment during the interval of charging.

A hub $j$ is mounted on the bearing afforded by the pedestal $b$ and its casting $i$, a suitable bushing $j'$ and packings $j^2 j^3$ being provided in addition to the runway registering with that $b'$ of the pedestal. This hub carries an annular flange-seat $k$, adapted to receive and support the inner edge of the filter-tank $c$. The packings $j^2 j^3$ must be reasonably tight, as they are relied upon to form an air-tight connection between the hub $j$ and the casting $i$ and pedestal $b$, respectively.

The inner wall $c^2$ of the tank $c$ has a plurality of openings extending therethrough below the filter-body $g$, establishing communication between each vacuum-compartment in said tank and the vacuum and pressure chambers in said hub $j$ successively, said openings being in permanent register with a plurality of passages $m$, extending on an incline through said hub $j$ and the bushing $j'$.

The pressure-chamber $i^2$ has fitted therein a spring-pressed valve-block $n$, provided with suitable packing, which block is fitted to the bushing $j'$ and normally pressed against the same by a plurality of springs $n'$, acting against said valve-block and the rear wall of the said chamber. The port in said valve is adapted to register successively with each of the passages $m$ and is provided to prevent the leakage of the air-pressure into the vacuum-chamber. This valve, it will be observed, is operated by the rotation of the bushing $j'$, its action being entirely automatic, there being normally within the chamber $i'$ the required pressure.

Attached to the stationary parts of the apparatus adjacent to the position assumed by the forward partition $f$ of that compartment when any one of the vacuum-compartments is in communication with the pressure-chamber is a fixed rod $o$, carrying a flexible screen $o'$, which rests upon the sheathing $h$ above the next compartment in the direction of rotation of the filter-tank and is extended about the wall $c^2$, as shown in Fig. 2, to prevent the flow of slimes onto the filter-body above the first-mentioned vacuum-compartment. Immediately forward of said screen a fixed supply-pipe or launder $p$ projects radially over each compartment as it passes under said screen $o'$. This supply-pipe or launder charges all parts of the filter section or body above the vacuum-compartment located directly beneath it simultaneously, thus distributing the slimes equally throughout the said filter-section.

The operation of the herein-described apparatus is substantially as follows: A more or less imperfect vacuum is created in the vacuum-chamber $i^2$ by means of a vacuum-pump (not shown) through the pipe $i^3$, which through the passages $m$ creates a similar vacuum in the several vacuum-compartments, except those communicating with the pressure-chamber $i'$, and cut out from both the chambers $i'$ and $i^2$ by the closure $i^5$. Slimes are then run into the slimes-chamber of the filter-tank $c$ from the supply-pipe or launder $p$, being fairly equally distributed thereover by reason of the relative arrangement of said launder to said tank. The screen $o'$ confines the slimes to the slimes-chamber above those compartments having no pressure or no vacuum thereunder. During this initial charging the filter-tank is slowly rotated, thus distributing the slimes throughout the entire slimes-chamber of the filter-tank $c$. During this rotation the solution filters through the sheathing $h$ and the filter-body $g$, each vacuum-compartment aiding in extracting a large percentage of the solution from the slimes. The solution thus separated enters said compartments and passes through the several passages $m$ to the vacuum-chamber $i^2$, from whence it is drawn by the vacuum-pump through the pipe $i^3$, subsequently being discharged into suitable tanks. The column of solution thus obtained aids materially in creating and maintaining the vacuum within said vacuum-chambers. As each passage $m$ approaches the valve $n$ its vacuum-compartment will be cut out from the vacuum-chamber $i^2$ and will be automatically connected with the pressure-chamber $i'$, thus equalizing the pressure on opposite sides of the section of the filter-body covering this compartment, or, when compressed air is used, placing greater than atmospheric air thereunder, loosening the tailings to facilitate their removal. Any desired implements or mechanisms may be employed in removing these tailings, which when they reach this position will contain but approximately twenty-five per cent. of the solution contained at the point of charging. A single revolution will ordinarily suffice to extract or separate a sufficient quantity or proportion of the solution to render it unprofitable to further dilute the tailings, thus avoiding the labor and time and the additional tank capacity which would otherwise be required in the subsequent separating, storing, and concentrating processes. Each section of the filter-body $g$ above the respective compartments as the tailings are discharged therefrom passes under the screen $o'$ and is at once recharged from the supply-pipe or launder $p$, the closure $i^5$ serving to cut out the compartment being charged until the quantity of slimes thereon is sufficient to prevent the exhaustion of the vacuum within the vacuum-chamber. The screen $o'$ also prevents any part of the fresh charges backing up upon the dry tailings and any loss of the solution from this source.

The arrangement of a plurality of compartments having a common slimes-chamber and filters closing the compartments rotatable about a common center and provided with several means whereby a vacuum is created and maintained in the said compartments throughout the greater part of each revolution provides a compact durable structure, the operation of which is continuous and not accompanied with material wear. The number of these compartments is immaterial and will vary according with the other dimensions of the apparatus. The purpose of providing a plurality of such compartments is to permit the vacuum being maintained thereunder as long as possible to insure the separation of as large a percentage of the solution as possible before restoring the pressure under each filter-section. This increases the capacity of the apparatus, and hence its economy of operation.

I am aware that the use of a vacuum under a filter-body is old in the arts and do not intend to claim such broadly. I believe, however, that it is broadly new to provide a horizontal rotatable filter-tank having a plurality of partitions whereby the lower part of said tank is divided into a plurality of air-tight compartments, a filter-body closing and forming a slimes-chamber common to all said compartments, and means creating and maintaining a vacuum in said compartments, and I intend to claim such broadly.

While I have described my invention in connection with an apparatus the details and design of which I prefer to employ, still I do not wish to be understood as limiting the claims to the exact details as shown and described with relation to that particular design, it being apparent that such details may be varied without departing from the spirit and scope of the invention.

Having described the invention, what I claim as new, and desire to have protected by Letters Patent, is—

1. In an apparatus of the character described, the combination of a horizontal filter-tank a plurality of partitions whereby the lower part of said tank is divided into a plurality of compartments, a filter-body closing and forming a slimes-chamber common to, all said compartments, means whereby said tank may be rotated, and means maintaining a vacuum in said compartments.

2. In an apparatus of the character described, the combination of a horizontal filter-tank a plurality of partitions whereby the lower part of said tank is divided into a plurality of compartments, a filter-body closing and forming a slimes-chamber common to, all said compartments, means whereby said tank may be rotated, means maintaining a vacuum in said compartments during the greater part of each revolution, and means cutting off each said compartment successively from said last-mentioned means and admitting air into said compartment.

3. In an apparatus of the character described, the combination of a horizontal filter-tank a plurality of partitions whereby the lower part of said tank is divided into a plurality of compartments, a filter-body closing and forming a slimes-chamber common to, all said compartments, means feeding slimes to said filter-body, means whereby said tank may be rotated, and means maintaining a vacuum in said compartments.

4. In an apparatus of the character described, the combination of a horizontal filter-tank, a plurality of radial air-tight partitions dividing the lower part thereof into a plurality of compartments, a filter-body closing said compartments whereby a slimes-chamber common to all said compartments is provided, means feeding slimes to said chamber, means whereby said tank may be rotated, means maintaining a vacuum in said compartments during the greater part of each revolution, and means cutting off each said compartment successively from last-mentioned means and admitting air into said compartment.

5. In an apparatus of the character described, the combination of a horizontal filter-tank, a plurality of radial air-tight partitions dividing the lower part thereof into a plurality of compartments, a filter-body closing said compartments whereby a slimes-chamber common to all said compartments is provided, a perforated metallic sheathing for said body, means feeding slimes to said chamber, means whereby said tank may be rotated, means maintaining a vacuum in said compartments during the greater part of each revolution, and means cutting off each said compartment successively from said last-mentioned means and admitting air into said compartment.

6. In an apparatus of the character described, the combination of a horizontal filter-tank, a plurality of radial air-tight partitions dividing the lower part thereof into a plurality of compartments, a filter-body closing said compartments whereby a slimes-chamber common to all said compartments is provided, means whereby said tank may be rotated, means maintaining a vacuum in said compartments during the greater part of each revolution, means cutting off each of said compartments successively from said last-mentioned means and admitting air into said compartment, means in advance of said last-mentioned means feeding slimes to said chamber, and a screen extending radially of said tank dividing said chamber between said cut-off means and said feeding means.

7. In an apparatus of the character described, the combination of a central bearing having a vacuum-chamber and a pressure-chamber therein, means whereby said vacuum-chamber may be connected with a vacuum-pump, means whereby said pressure-chamber may be connected with air under atmospheric pressure, or greater, a horizontal filter-tank mounted on and rotatable about said bearing, a plurality of air-tight partitions dividing the lower part of said tank into a plurality of compartments, a filter-body closing and forming a slimes-chamber common to, all said compartments means whereby said compartments are during each revolution placed in communication with said vacuum and said pressure chamber, and means rotating said tank.

8. In an apparatus of the character described, the combination of a central bearing having a vacuum-chamber and a pressure-chamber therein, means whereby said vacuum-chamber may be connected with a vacuum-pump, means whereby said pressure-chamber may be connected with air under atmospheric pressure, or greater, a horizontal filter-tank mounted on and rotatable about said bearing, a plurality of air-tight partitions dividing the lower part of said tank into a plurality of compartments, a filter-body closing and forming a slimes-chamber common to all said compartments means whereby said compartments are during each revolution placed in communication with said vacuum and said pressure chamber, means rotating said tank, and means feeding slimes to said filter.

9. In an apparatus of the character described, the combination of a central bearing having a vacuum-chamber and a pressure-chamber therein, means whereby said vacuum-chamber may be connected with a vacuum-pump, means whereby said pressure-chamber may be connected with air under atmospheric pressure, or greater, a hub mounted on said bearing and rotatable about same, a filter-tank carried by said hub, a plurality of air-tight partitions dividing the lower part of said tank into a plurality of compartments, a filter-body closing said compartments, said hub having a plurality of passages therethrough, each adapted to communicate with said vacuum-chamber, and said pressure-chamber, successively, and said compartments respectively having openings therein registering with said passages, and means rotating said tank and said hub.

10. In an apparatus of the character described, the combination of a central bearing having a vacuum-chamber and a pressure-chamber therein, a valve-block seated in said pressure-chamber, means whereby said vacuum-chamber may be connected with a vacuum-pump, means whereby said pressure-chamber may be connected with air under atmospheric pressure or greater, a hub mounted on said bearing and rotatable about same, a filter-tank carried by said hub, a plurality of air-tight partitions dividing the lower part of said tank into a plurality of compartments, a filter-body closing said compartments, said hub having a plurality of passages therethrough, each adapted to communicate with said vacuum-chamber, and said pressure-chamber, successively and said compartments having respectively openings therein registering with said passages, and means rotating said tank and said hub.

11. In an apparatus of the character described, the combination of a central bearing having a vacuum-chamber and a pressure-chamber therein, a spring-pressed valve-block whereby the vacuum-compartments are automatically connected with said pressure-chamber, means whereby said vacuum-chamber may be connected with a vacuum-pump, means whereby said pressure-chamber may be connected with air under atmospheric pressure or greater, a hub mounted on said bearing and rotatable about same, a filter-tank carried by said hub, a plurality of air-tight partitions dividing the lower part of said tank into a plurality of compartments, a filter-body closing said compartments, said hub having a plurality of passages therethrough, each adapted to communicate with said vacuum-chamber, and said pressure-chamber, successively and said compartments having respectively, openings therein registering with said passages, and means rotating said tank and said hub.

12. In an apparatus of the character described, the combination of a central bearing having a vacuum-chamber and a pressure-chamber therein, means whereby said pressure-chamber may be connected with a vacuum-pump, means whereby said pressure-chamber may be connected with air under atmospheric pressure, or greater, a hub mounted on said bearing and rotatable about same, a filter-tank carried by said hub, a plurality of air-tight partitions dividing the lower part of said tank into a plurality of compartments, a filter-body closing said compartments, said hub having a plurality of passages therethrough, each adapted to communicate with said vacuum-chamber, and said pressure-chamber, successively, and said compartments respectively having openings therein registering with said passages, a closure whereby said compartments are successively cut off from both said vacuum and said pressure chambers during a part of the charging interval, and means rotating said tank and said hub.

13. In an apparatus of the character described, the combination of a rotary filter-body, means creating a vacuum under successive sections of said body, means cutting off the vacuum and admitting air to said sections successively, and a launder or supply-pipe projected over and extended radially of said filter-body, whereby slimes will be discharged on said section at a point beyond that at which said last-mentioned means is situated.

14. In an apparatus of the character described, the combination of a rotary filter-body, means creating a vacuum under successive sections of said body, means cutting off the vacuum and admitting air to said sections successively, a launder or supply-pipe projected over and extended radially of said filter-body, whereby slimes will be discharged on said section at a point beyond that at which said last-mentioned means is situated, and a screen between said launder and said last-mentioned means.

In witness whereof I have hereunto affixed my signature, this 8th day of April, 1905, in the presence of two witnesses.

EDWARD PARRISH.

Witnesses:
N. L. FROTHINGHAM,
J. C. SHAY.